INVENTORS
Donald V. Badgley
Webster T. VanFleet

United States Patent Office 3,383,248
Patented May 14, 1968

3,383,248
BATTERY HAVING A CURED POLYISOPRENE
SEPARATOR
Donald V. Badgley, Muncie, and Webster T. Van Fleet, Yorktown, Ind., assignors to General Motors Corporation, Detroit, Mich., a corporation of Delaware
Filed Feb. 25, 1966, Ser. No. 530,224
9 Claims. (Cl. 136—146)

ABSTRACT OF THE DISCLOSURE

A cured polyisoprene battery separator containing in its uncured state synthetic polyisoprene, sulfur, a curing accelerator, and silica gel, wherein the synthetic polyisoprene has at least about 80% by weight cis-1,4 addition form, not more than 7% by weight 3,4 addition form and the remainder trans 1,4 addition form of the polyisoprene.

---

This invention relates to battery separators, and more particularly to synthetic polyisoprene separators. It further relates to processes for making these battery separators.

A storage battery is usually constructed with a plurality of electrolytic cels each of which contains a series of connected positive plates having intermeshed therewith a series of connected negative plates. These plates are usually immersed in an electrolytic solution of sulfuric acid and water. Between each pair of adjacent plates is a separator. Frequent causes of breakdown within the battery cell itself are plate-to-plate contact from buckling, bridging of the plates at one or more points and metallic build-up between the plates, sometimes referred to as "treeing." The function of the battery separator is to reduce as much as possible these and similar internal causes of battery failure.

Although the ultimate use and environmental conditions which a battery must withstand determine to a certain extent the properties and characteristics required of battery separators, certain of these are desirable in virtually all such separators. Among such desirable properties are good acid resistance, high oxidation resistance, and non-contamination of and inertness with respect to the electrolyte.

More recently, dry storage batteries, in which the electrolyte is not added to the cell until just prior to the initial service of the battery, have been employed extensively. In this type of battery, additional requirements are placed upon the separators utilized therein. They must be able to withstand long periods of dry storage, for example, three years, without any deterioration. The effect of this dry storage of the separators on the electrolyte, that is, any immediate lowering of the specific gravity upon addition of the electrolyte, should be minimized, since too great a drop necessitates the recharging of the battery prior to its being placed in service.

One of the more important characteristics of a battery separator is its electrical resistance, which as usually defined in the industry should be as low as possible in order to obtain the maximum current from the battery. Since electrical resistance values increase at a more rapid rate as temperature falls, the problem of maintaining a low electrical resistance at temperatures below freezing, for example, 0° F., is particularly acute. In addition to temperature, this electrical resistance is dependent upon many factors, among the most important of which are the porosity and web thickness of the separators. The greater the porosity of the separator, which allows easier passage of ions therethrough, the less is the electrical resistance. The less the web thickness, which permits a closer spaced relationship of the positive and negative plates, the less distance the ions are required to travel between plates and again the less is the electrical resistance imparted by the separator. However, despite the importance of a lower electrical resistance, the porosity must not be so great as to allow movement of particles from positive to negative plates, causing "treeing" between plates. In addition, the web thickness must not be minimized to the extent that the battery separator cannot withstand the forces to which it is subjected during its processing and positioning in the battery. Thus, it is equally important to obtain low electrical resistance characteristics without sacrificing any physical properties, particularly those indicative of strength and rigidity, for example, bend and tear properties.

Accordingly, it is the principal object of this invention to provide a new battery separator which has improved electrical resistance characteristics, particularly at temperatures below freezing, and improved dry storage characteristics, without sacrificing other desirable properties, and even provides certain improved physical properties. Another object is to provide a particular synthetic polyisoprene battery separator having these improved properties when compared with presently used separators, such as natural rubber, and yet is more economical. Still a further object is to provide a battery separator having a particular synthetic polyisoprene composition which permits improved processing, reduces waste, and thus, is more economical.

These and other objects and advantages will become apparent from the following description and figures in which.

Figure 1:
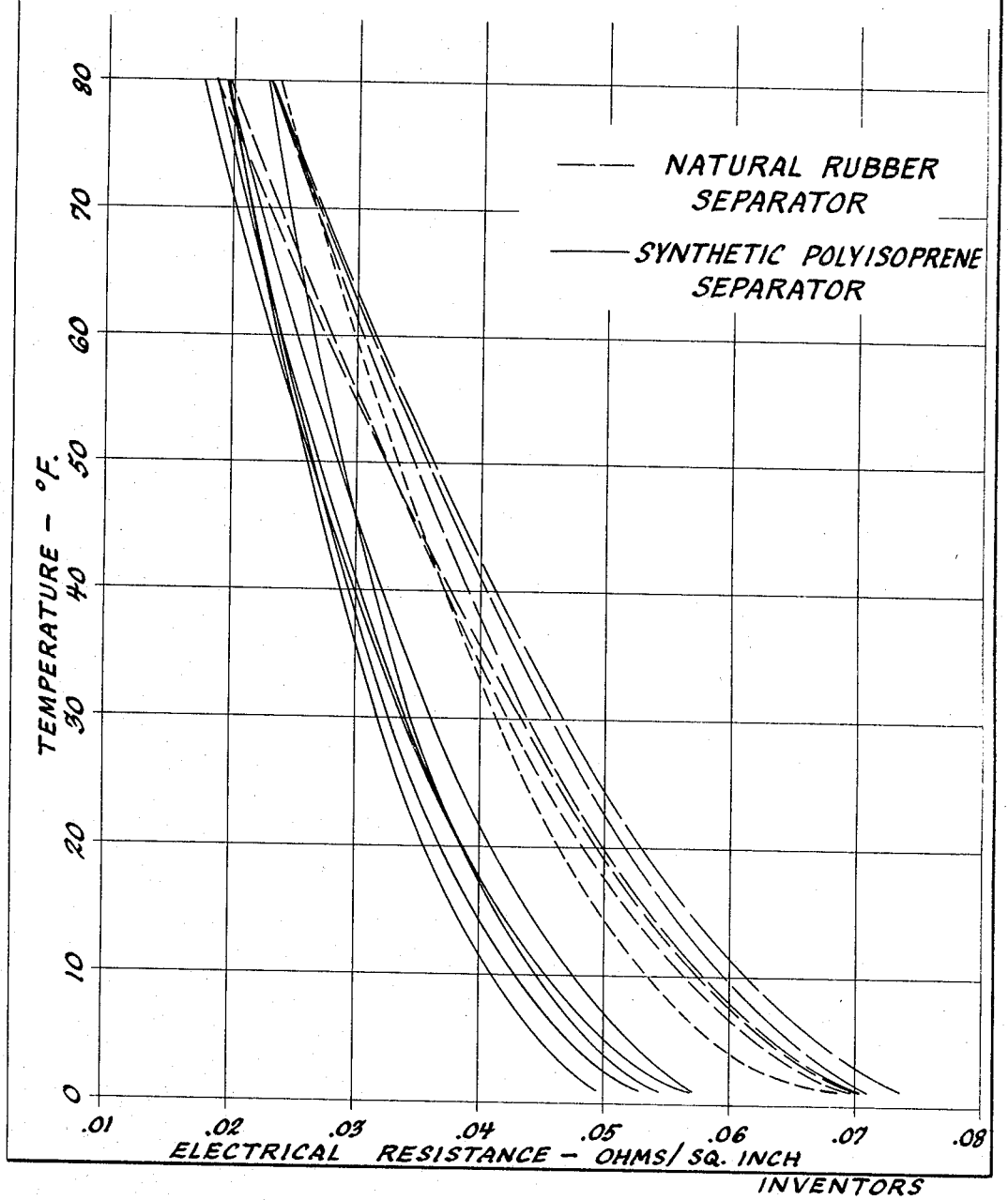
FIGURES 1 and 2 are graphs showing the electrical resistance of certain battery separators at various temperatures.

It has been discovered that the improvements mentioned above in the objects can be obtained with a battery separator having a cured composition of the following ingredients, a particular synthetic polyisoprene, the isoprene monomer of which can also be designated 2-methyl butadiene-1,4, having at least about 80% of the cis-1,4 addition product, not more than 7% of the 3,4 addition product and the remainder the trans-1,4 addition product, all by weight of the total isoprene polymer, sulfur as the curing agent, a curing accelerator, and silica gel as the porous-structure forming material. It has been further found, unexpectedly, that the use of a particular curing accelerator, diphenyl guanidine, in the aforementioned battery separator, results in advantageous processing improvements such as the elimination of masterbatching which is required during the processing of battery separators presently employing natural rubber, lower processing temperatures and the like, all of which, of course result in a more economical operation.

More particularly, the synthetic polyisoprene material employed in making the separator must have at least about 80% of the cis-1,4 addition form of the isoprene polymer, that is,

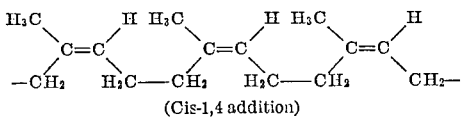
(Cis-1,4 addition)

not more than 7% of the 3,4 addition product of the isoprene polymer,

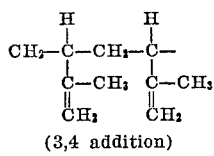
(3,4 addition)

and the remainder the trans-1,4 addition form of the isoprene polymer,

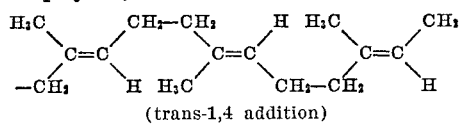
(trans-1,4 addition)

each percentage being based on the total weight of the polymer itself. Most preferably the cis-1,4 addition form is present in an amount of from 93–100%, the remaining corresponding 7–0% of the polymer being either the 3,4 addition product or the trans-1,4 addition form. An example of such a synthetic polyisoprene within the preferred range is supplied by the Goodyear Rubber Company under the trade name "Natsyn." This product contains 95% by weight of the cis-1,4 addition form of the synthetic polyisoprene and correspondingly 5% by weight of the 3,4 addition product. Any one of the various materials heretofore utilized as rubber curing accelerators, for example, the guanidines such as diorthotolyl guanidine and triphenyl guanidine, the sulfides such as tetraethyl and tetramethyl-thiuram disulfides, and the like, can be employed in the present battery separators. However, a single specific curing accelerator, diphenyl guanidine, is preferred since, as aforementioned, it imparts substantial improvement in the processing of the composition employed to produce the separator, which will be described hereinafter.

The proportions of the various ingredients of the compositions employed in the battery separators can be varied over a rather broad range depending upon the ultimate use of the battery and the conditions to which it will be exposed. Although such proportions can be determined by one skilled in the art, as a practical matter, those within the following ranges are preferred to produce separators which retain the aforementioned good properties and characteristics when employed in storage batteries. These proportions comprise, per 100 parts by weight of the synthetic polyisoprene, about 30 to about 50 parts of sulfur, about .1 to about 5 parts of the curing accelerator, and about 270 to about 350 parts of the silica gel.

Example I

A typical embodiment of a battery separator of the present invention and a natural rubber separator well known and employed in the art today were produced according to the following formulations:

| Synthetic polyisoprene composition: | Parts by weight in pounds |
|---|---|
| "Natsyn" | 109 |
| "Elastopar" | 0.2 |
| Sulfur | 46 |
| Silica Gel | 316 |

| Natural rubber composition: | Parts by weight in pounds |
|---|---|
| Natural rubber | 109 |
| "Pepton 22" | 0.1 |
| "Resinex 10" | 5 |
| Diphenyl guanidine | 3 |
| Sulfur | 46 |
| Silica gel | 316 |

The "Elastopar" employed in the above formulation is comprised of 33% n-methyl-n, 4 dinitroso aniline and 67% whitetex clay. The "Pepton 22" is a plasticizer, di-ortho-benzamidophenyl disulfide. The "Resinex 10," a product of the Pennsylvania Industrial Chemical Corporation, is a mixture of low molecular weight polymers of polycyclic unsaturated aromatics being in the coumarone-indene range, having high carbon to hydrogen ratios, a specific gravity of 1.05 and an approximate M.P. of 50° F.

The physical properties of the battery separators produced from each of the above formulations were obtained and are compared in the table below.

| Physical Properties | Synthetic Polyisoprene | Natural Rubber |
|---|---|---|
| Bend Strength, Degrees | 86 | 45 |
| Chip Strength, Inches | 2.0 | 2.0 |
| Tear Strength, Grams | 326 | 250 |
| Izod Impact, Inch Pounds | 15.5 | 8 |
| Web Thickness, Inches | .025 | .025 |

While the web thickness of each of these battery separators is identical, it is obvious that the physical properties of the one produced from synthetic polyisoprene are far superior to those of the natural rubber separator.

Example II

A preferred embodiment of a formulation utilized in the applicant's battery separator and a natural rubber formulation are set forth below.

| Synthetic polyisoprene composition: | Parts by weight in pounds |
|---|---|
| "Natsyn" | 109 |
| Sulfur | 48 |
| Diphenyl guanidine | 3.5 |
| Silica gel | 316 |

| Natural rubber composition: | |
|---|---|
| Natural rubber masterbatch | 109 |
| Sulfur | 46 |
| Diphenyl guanidine | 3 |
| Silica gel | 316 |

The natural rubber masterbatch employed in the above formulation comprised 3 ounces by weight of a plasticizer, "Pepton 22," identified above. Very slight differences in the amounts of sulfur and diphenyl guanidine were employed to bring the two formulations to the same level of curing, since slightly more of the synthetic polyisoprene polymer is present, for the same batch weight of uncured polymer, than with the natural rubber polymer.

The physical properties of battery separators produced from these two compositions were obtained and are set forth in the following table.

| Physical Properties | Synthetic Polyisoprene | Natural Rubber |
|---|---|---|
| Bend Strength, Degrees | 75 | 45 |
| Chip Strength, Inches | 2.65 | 2.0 |
| Tear Strength, Grams | 267 | 250 |
| Izod Impact, Inch Pounds | 16.4 | 8 |
| Web Thickness, Inches | .023 | .025 |

It is apparent that the synthetic polyisoprene separator of a lesser web thickness has superior physical properties to those of natural rubber.

Figure 2:
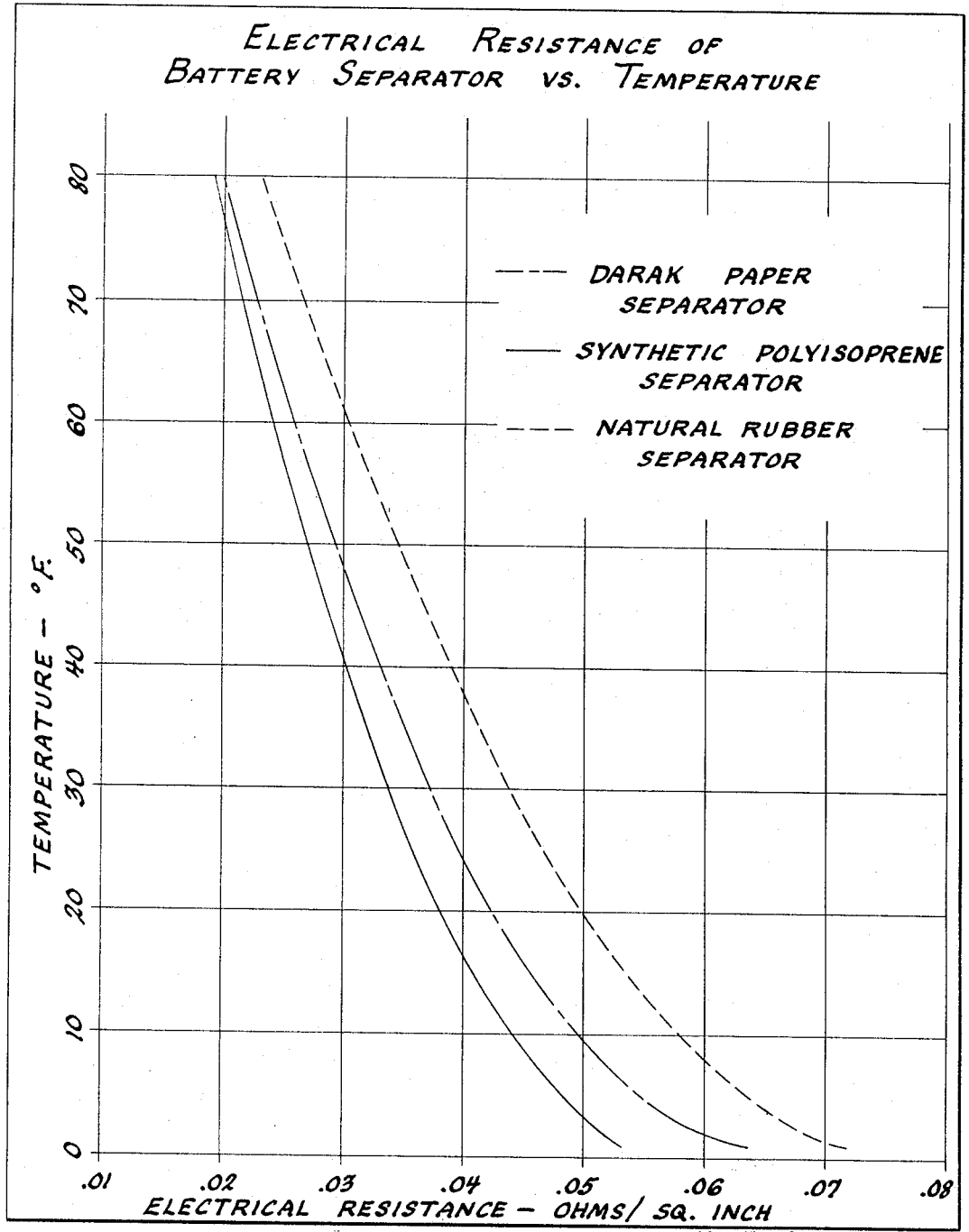

In order to show the improved electrical resistance of the new synthetic polyisoprene battery separators, reference is directed to FIGURES 1 and 2 in which the electrical resistance in ohms/sq. inch of several battery separators has been plotted with respect to a broad range of of temperatures. Referring particularly to the graph of FIGURE 1, there is shown the electrical resistance of six samples of "Natsyn" rubber separators and six samples of natural rubber separators, each produced according to the formulations of Example II above, at temperatures ranging from 0° to 80° F. The graph appearing in FIGURE 2 is somewhat similar to that of FIGUR5 1 but has been simplified to show the average electrical resistance of the six synthetic polyisoprene separators and the six natural rubber separators of FIGURE 1, which averages are compared with the electrical resistance of "Darak" paper, again at a range of temperatures varying from 0° to 80° F. the "Darak" paper utilized in the graph of FIGURE 2 is a commercial paper separator composed of a phenol-formaldehyde resin impregnated cellulosic fiber paper.

As is readily ascertainable from these graphs, the electrical resistance of the synthetic polyisoprene battery separators is considerably improved over that of natural rubber separators currently employed in the art. This improvement is particularly noticeable at the lower temperatures below freezing at which the electrical resistance increases at a greater rate than at higher temperatures. For example, at 20° F., the average electrical resistance of the natural rubber separators is .05 ohm per square inch while the average for the synthetic polyisoprene separators is only .038 ohm per square inch, about 25% less. Even the maximum value of the electrical resistance at 20° F. of the synthetic polyisoprene separators tested was only .041 ohm per square inch, still lower than the average for the natural rubber separators. At about 0° F. the average electrical resistance of the synthetic polyisoprene separator is .053 ohm per square inch, or about .02 ohm per square inch lower than that of the natural rubber separators. Again, at about 0° F. the synthetic polyisoprene separator having the maximum electrical resistance of .057 is considerably below the average of the natural rubber separators. It is also apparent from the tables set forth above the such improvements in electrical resistance have been obtained with no sacrifice in the desirable physical properties and characteristics of battery separators, and, in some cases, the improved electrical resistance is accompanied by improved physical properties.

Figure 3:
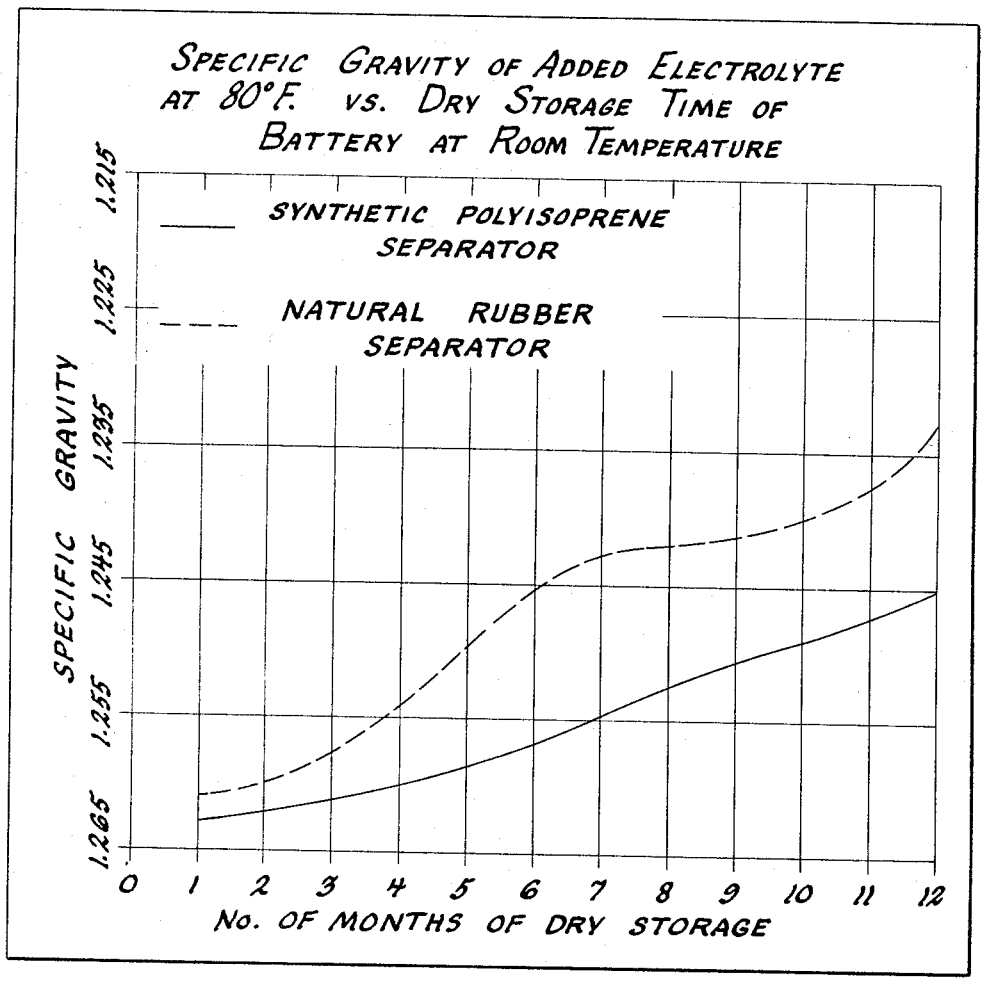
FIGURE 3 is a graph comparing the specific gravity with the dry storage time at room temperature of twelve batteries containing natural rubber separators and twelve containing the particular synthetic polyisoprene separators of the present invention.

Again, utilizing the separators produced according to the formulations of Example II, another of the improved features of the synthetic polyisoprene battery separators is clearly shown in the graph of FIGURE 3. In the procedure employed to obtain the readings on the graph, the batteries were formed, washed and dried and placed in storage. After one month, two batteries, one with natural rubber separators and the other with synthetic polyisoprene separators, were removed from storage and filled with an electrolyte, an aqueous solution of sulfuric acid having a specific gravity of 1.265, at 80° F. After 20 minutes the specific gravity in each cell was checked. After two months, three months, etc. at intervals of one month, up to twelve months, this procedure was repeated and the average specific gravity of the cell readings of the batteries was plotted as shown on the graph. As is readily apparent from this graph, when applicants' particular synthetic polyisoprene separators are employed, there is considerable improvement in the specific gravity measurements obtained upon activation of each of the batteries by the addition of a suitable electrolyte, such as sulfuric acid.

As aforementioned, a feature of this invention includes the use of a specific curing accelerator, diphenyl guanidine, which, along with applicants' particular synthetic polyisoprene, results in advantageous improvements in processing the battery separators produced therefrom. Such a combination was found, surprisingly, to completely eliminate the necessity to masterbatch, that is, thoroughly mix a plasticizer with the synthetic polyisoprene prior to the addition of other materials such as sulfur and silica gel to the polyisoprene, to obtain a homogenous compounding of the formulation, as is required when natural rubber is employed. Other improvements in processing over the natural rubber separators include lower mixing, milling and calendering temperatures. Such improvements, particularly the elimination of the masterbatching step, results in an overall average yield of 87.3% synthetic polyisoprene separators, as compared with an overall yield of 85.5% for the natural rubber separators, each of these percentages being calculated from a theoretical 100% yield based upon the amount of materials employed in making the separators.

Accordingly, in order to produce the synthetic polyisoprene separators of this invention, it is merely necessary to compound and mix all of the materials in a single operation, followed by extrusion and/or calendering to form a continuous strip. The preferred calendering temperature ranges from about 145° to 165° F. After calendering, the resulting stock is wrapped in rolls and cured at a temperature of about 250° F. to about 350° F., preferably at about 290° F. to about 300° F., depending upon the length of time and the pressure at which the curing operation is carried out. For example, the stock can be fully cured at 295° F. for eight hours under a non-evaporative atmosphere. During the curing operation the silica gel present in the stock gives up its water, which is removed following the completion of the curing. It is to be understood that although the optimum conditions, e.g., temperature, pressure, proportions, etc., and the preferred method of producing applicants battery separators have been disclosed, other processing steps and other materials, for example, small amounts of plasticizers, softeners, inert fillers such as the various silicas and siliceous materials, for example, diatomaceous earth, and the like can be added at the appropriate time during the processing. Such materials can be added to impart to the separators particular properties and characteristics which are desirable and well known. For example, the diatomaceous earth can be added to stiffen the separator. These and other such materials are well known to one skilled in the art who would have no trouble determining the appropriate proportions depending on the characteristics desired in the final separator product.

Although, applicants' synthetic polyisoprene battery separators have been described in their preferred embodiments herein modifications coming within the spirit of this invention, can be made by those having ordinary skill in the art. The invention is intended to be limited only by the following claims and equivalents thereto.

We claim:
1. A battery comrising electrodes and at least one separator having an improved electrical resistance, said separator comprising a cured polyisoprene rubber, the uncured composition of said rubber comprising synthetic polyisoprene, sulfur, a curing accelerator and silica gel, said synthetic polyisoprene consisting essentially of at least about 80% of the cis-1,4 addition form of the polyisoprene, not more than 7% of the 3,4 addition form of the polyisoprene and the remainder the trans-1,4 addition form of the polyisoprene, all percentages being by weight of the total polyisoprene.

2. The battery of claim 1 wherein the cis-1,4 addition form is present in an amount of from 93–100%.

3. The battery of claim 2 in which there is present 95% of the cis-1,4 addition form and 5% of the 3,4 addition form.

4. The battery of claim 1 in which the curing accelerator is diphenyl guanidine.

5. The battery of claim 4 wherein said separator has a maximum electrical resistance at 20° F. of about 0.04 ohm per square inch.

6. The battery of claim 4 wherein said separator has a maximum electrical resistance at 0° F. of about 0.057 ohm per square inch.

7. The battery of claim 4 in which the ingredients of the separator composition are present in the following parts by weight per hundred parts of the synthetic polyisoprene; sulfur about 30–50 parts, diphenyl guanidine about 0.1 to about 5 parts, and silica gel about 270–350 parts.

8. The battery of claim 7 wherein said separator has a maximum electrical resistance at 20° F. of about 0.04 ohm per square inch.

9. The battery of claim 7 wherein said separator has a maximum electrical resistance at 0° F. of about 0.057 ohm per square inch.

References Cited

UNITED STATES PATENTS

| | | | |
|---|---|---|---|
| 2,653,987 | 9/1953 | Baty | 136—146 |
| 2,711,434 | 6/1955 | Ziegner | 136—146 XR |
| 3,026,366 | 3/1962 | Comeau et al. | 136—148 XR |
| 3,054,843 | 9/1963 | Yurgen | 136—146 |
| 3,328,208 | 6/1967 | Ryhiner et al. | 136—146 XR |
| 2,970,128 | 1/1961 | Csendes | 260—41.5 |
| 2,989,513 | 6/1961 | Hendry et al. | 260—775 |

ALLEN B. CURTIS, *Primary Examiner.*

WINSTON A. DOUGLAS, *Examiner.*

D. L. WALTON, *Assistant Examiner.*